United States Patent
Nammi

(10) Patent No.: US 9,680,607 B2
(45) Date of Patent: Jun. 13, 2017

(54) CHANNEL QUALITY REPORTING IN A MULTI-ANTENNA WIRELESS COMMUNICATION SYSTEM

(71) Applicant: Telefonaktiebolaget L M Ericsson (publ), Stockholm (SE)

(72) Inventor: Sairamesh Nammi, Kista (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 123 days.

(21) Appl. No.: 14/430,736

(22) PCT Filed: Sep. 13, 2013

(86) PCT No.: PCT/SE2013/051071
§ 371 (c)(1),
(2) Date: Mar. 24, 2015

(87) PCT Pub. No.: WO2014/051498
PCT Pub. Date: Apr. 3, 2014

(65) Prior Publication Data
US 2015/0249524 A1    Sep. 3, 2015

Related U.S. Application Data

(60) Provisional application No. 61/707,451, filed on Sep. 28, 2012.

(51) Int. Cl.
| H04L 1/00 | (2006.01) |
| H04L 1/08 | (2006.01) |
| H04L 12/26 | (2006.01) |

(52) U.S. Cl.
CPC .......... *H04L 1/0073* (2013.01); *H04L 1/0028* (2013.01); *H04L 1/0031* (2013.01);
(Continued)

(58) Field of Classification Search
None
See application file for complete search history.

(56) References Cited

U.S. PATENT DOCUMENTS

| 2005/0147040 A1* | 7/2005 | Vayanos | H03M 13/2707 370/235 |
| 2011/0243012 A1* | 10/2011 | Luo | H04L 5/0055 370/252 |
| 2011/0249578 A1* | 10/2011 | Nayeb Nazar | H04L 1/0027 370/252 |

FOREIGN PATENT DOCUMENTS

| WO | WO 2013/166699 | 11/2013 |
| WO | WO 2013/172674 | 11/2013 |

OTHER PUBLICATIONS

International Search Report for International application No. PCT/SE2013/051071, Dec. 18, 2013.

(Continued)

*Primary Examiner* — Tejis Daya
(74) *Attorney, Agent, or Firm* — Patent Portfolio Builders, PLLC

(57) ABSTRACT

In MU-MIMO scenarios, a receiving node (1000) provides feedback on a feedback channel to a transmitting node (1300) regarding a channel between the receiving and the transmitting nodes (1000, 1300). To reduce signaling overhead, a feedback channel structure, such as HS-DPCCH, is used in which the fields that carry feedback information are specifically agreed upon. For example, in uplink signaling in a 4-branch MIMO, it was agreed that two codewords be used for CQI reporting and to send all information in one subframe. This structure is valid when the preferred rank is 2, 3, or 4. But when the preferred rank is 1, the CQI information does not fill the two codewords. To address such issues, mechanisms to map such feedback information to com-
(Continued)

pletely fill the allocated space are proposed. Padding and repeating are examples of such mechanisms.

20 Claims, 9 Drawing Sheets

(52) U.S. Cl.
CPC .............. *H04L 1/0067* (2013.01); *H04L 1/08* (2013.01); *H04L 43/08* (2013.01)

(56) References Cited

OTHER PUBLICATIONS

PCT Written Opinion of the International Searching Authority for International application No. PCT/SE2013/051071, Dec. 18, 2013.
3GPP TSG-RAN WG1 #70; Qingdao, P.R. of China; Title UL-Feedback Channel Design for Four branch MIMO System with Single Carrier (R1-123757), Aug. 13-17, 2012.
3GPP TSG-RAN WG1 #70bis; San Diego, USA; Title: Remaining Issues in HS-DPCCH Design for Single Carrier for Four Branch MIMO System (R1-12XXXX), Oct. 8-11, 2012.
3GPP TSG RAN WG1 Meeting #68bis; Jeju, Korea; Title: UL feedback design for 4-Tx MIMO (R1-121725), Mar. 26-30, 2012.
3GPP TSG RAN WG1 Meeting #70; Qingdao, China; Title: HS-DPCCH design for 4-branch MIMO (R1-123817), Aug. 13-17, 2012.
3GPP TSG RAN WG1 Meeting #70; Qingdao, P.R. China; Title: Remaining issues on feedback design for Four Branch Downlink MIMO (R1-123566), Aug. 13-17, 2012.
3GPP TSG RAN WG1 Meeting #65; Barcelona, Spain; Title: 4-branch MIMO for HSDPA (R1-111763), May 9-13, 2011.
3GPP TSG-RAN WG1 Meeting #68; Dresden, Germany; Title: Feedback Channel Design for Four branch MIMO System (R1-120361), Feb. 6-10, 2012.

* cited by examiner

CHANNEL QUALITY REPORTING IN A MULTI-ANTENNA WIRELESS COMMUNICATION SYSTEM

RELATED APPLICATIONS

This nonprovisional application is a U.S. National Stage Filing under 35 U.S.C. 371 of International Patent Application Serial No. PCT/SE2013/051071, filed Sep. 13, 2013, and entitled "CHANNEL QUALITY REPORTING IN A MULTI ANTENNA WIRELESS COMMUNICATION SYSTEM" which claims priority to U.S. Provisional Patent Application No. 61/707,451 filed on Sep. 28, 2012, both of which are incorporated by reference in their entirety.

TECHNICAL FIELD

The technical field of the present disclosure generally relates to wireless communication systems including methods, apparatuses, and/or systems for channel quality reporting.

BACKGROUND

Several new features are added for the long term HSPA (high speed packet access) evolution in order to meet the requirements set by the IMT-A (International Mobile Telecommunications Advanced). The main objective of these new features is to increase the average spectral efficiency.

One possible technique for improving downlink spectral efficiency would be to introduce support for 4-branch MIMO (multiple input multiple output), i.e., utilize up to four Tx (transmit) and Rx (receive) antennas to enhance the spatial multiplexing gains and to offer improved beam forming capabilities. 4-branch MIMO provides up to 84 Mbps per 5 MHz carrier for high SNR (signal-to-noise ratio) users and improves coverage for low SNR users.

The current HSDPA system (Release 7-10) supports one or two transmit antennas at the Node B. For these systems, from channel sounding, the UE (user equipment) measures the channel and reports the channel state information in one sub frame to the Node B as feedback. Typically this report includes a CQI (channel quality indicator) which explicitly indicates a preferred rank and a PCI (precoding control indicator). The UE sends this report periodically for every subframe or TTI (transmit time interval) as feedback. Once the Node B receives this report, it grants modulation and coding, number of codes, rank and the precoding channel indicator to each specific UE based on a scheduler metric.

SUMMARY

A non-limiting aspect of the disclosed subject matter may be directed to a method performed by a receiving node of a wireless communication system to provide feedback to a transmitting node. The method performed by the receiving node may include determining a channel state of a wireless channel between the transmitting node and the receiving node based on a reference signal transmitted from the transmitting node. The channel state may include a plurality of feedback parameters. A feedback parameter may indicate a quality characteristic of the wireless channel as estimated by the receiving node, or may indicate a preference of the receiving node in a transmission characteristic of data transmission from the transmitting node. The method may also include filling a feedback subframe based on the channel state. The feedback subframe may include a plurality of feedback fields. Each feedback field may correspond to one of the feedback parameters of the channel state, and may be allocated to carry a value of the feedback parameter corresponding to that feedback field. A field length of each feedback field may be predetermined. The method may further include sending a feedback signal to the transmitting node over a feedback channel. The feedback signal may include the feedback subframe. The feedback subframe may be such that upon reconstruction of the feedback subframe at the transmitting node, for at least one feedback field, further processing may be required to determine whether that feedback field is carrying a feedback value or carrying an extended value of the feedback parameter corresponding to that feedback field. In this context, a feedback value may be viewed as the value of the corresponding feedback parameter, and the extended value may be viewed as a value that requires further processing to extract the feedback value.

Another non-limiting aspect of the disclosed subject matter may be directed to a computer-readable medium that includes therein programming instructions. When a computer executes the programming instructions, the computer may execute the method performed by a receiving node of a wireless communication system to provide feedback to a transmitting node as described above.

Another non-limiting aspect of the disclosed subject matter may be directed to a receiving node of a wireless communication system. The receiving node may be structured to provide feedback to a transmitting node. The receiving node may include a channel estimator, a feedback manager, and a communicator. The channel estimator may be structured to determine a channel state of a wireless channel between the transmitting node and the receiving node based on a reference signal transmitted from the transmitting node. The feedback manager may be structured to fill a feedback subframe based on the channel state. The communicator may be structured to send a feedback signal to the transmitting node over a feedback channel.

A non-limiting aspect of the disclosed subject matter may be directed to a method performed by a transmitting node of a wireless communication system to provide transmission control information in to a receiving node. The method performed by the transmitting node may include reconstructing a feedback subframe from a feedback signal received from the receiving node over a feedback channel. The feedback subframe may include a predetermined number of feedback fields. Each feedback field may correspond to one of a plurality of feedback parameters where each feedback field each may be allocated to carry a value of the feedback parameter corresponding to that feedback field. A field length of each feedback field may be predetermined. The method may also include determining, for at least one feedback field, whether that feedback field is carrying an extended value or a feedback value of the corresponding feedback parameter. The feedback value may be viewed as a value of the corresponding feedback parameter, and the extended value may be viewed as a value that requires further processing to extract the feedback value. The method may further include retrieving, for each feedback field determined to carry the extended value, the extended value from that feedback field, and extracting the feedback value of the corresponding feedback parameter from the extended value. The method may yet include retrieving, for each feedback field determined to carry the feedback value, the feedback value of the corresponding feedback parameter from that feedback field. The method may yet further include sending the transmission control information to the receiving node based on the feedback values. The transmission control information may specify transmission characteristics that will be applied by the transmitting node in transmitting data to the receiving node.

Another non-limiting aspect of the disclosed subject matter may be directed to a computer-readable medium that includes therein programming instructions. When a computer executes the programming instructions, the computer may execute the method performed by a transmitting node of a wireless communication system to provide transmission control information to a receiving node as described above.

Another non-limiting aspect of the disclosed subject matter may be directed to a transmitting node of a wireless communication system structured to provide transmission control information to a receiving node. The transmitting node may include a feedback decoder and a transmission parameters manager. The feedback decoder may be structured to reconstruct a feedback subframe from a feedback signal received from the receiving node over a feedback channel. The transmission parameters manager may be structured to determine, for at least one feedback field, whether that feedback field is carrying an extended value or a feedback value of the feedback parameter corresponding to that feedback field. The transmission parameters manager may also be structured to retrieve the extended value from the feedback field of each feedback field determined to carry the extended value, and to extract the feedback parameter from the extended value. The transmission parameters manager may further be structured to retrieve the feedback value from the feedback field of each feedback field determined to carry the feedback value. The transmissions parameters manager may yet be structured to send the transmission control information to the receiving node based on the feedback values.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
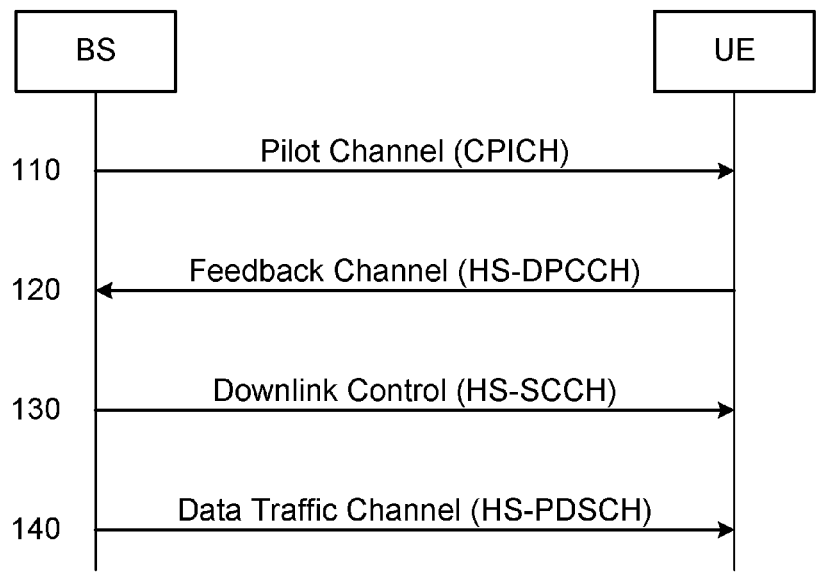
FIG. 1 illustrates an example of messages exchanged between a base station and a wireless terminal during a typical call setup.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor or "DSP" hardware, read only memory or "ROM" for storing software, random access memory or RAM, and non-volatile storage.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1×EVDO, Wireless LAN, WiFi, etc. Thus, the scope of this disclosure is not limited to the set of 3GPP wireless communication systems and can encompass many domains of wireless communication systems. Also, a wireless terminal will be used as an example of a receiver in which the described method can be performed. Examples of the wireless terminal include UE, laptop, PDA, smart phone, mobile terminal, etc. That is, the descriptions generally will focus on the downlink transmissions. However, the subject matter is equally applicable to uplink transmissions. That is, the disclosed subject matter is applicable to any node of the network including base stations—e.g., RBS, Node B, eNode B, eNB, etc.—and relay stations that receive wireless signals.

As mentioned above, MIMO may be utilized to improve downlink spectral efficiency. For example, in a 4-branch MIOM, four Tx and Rx antennas can be used to enhance the spatial multiplexing gains and to offer improved beam forming capabilities. Also as indicated, current HSDPA (high speed downlink packet access) systems supports one or two transmit antennas at the Node B. For these systems, from channel sounding, the UE measures the channel and reports the CSI (channel state information) in one sub frame to the Node B as feedback. Typically this report includes CQI and PCI, and the UE sends this report periodically for every subframe or TTI as feedback. Once the Node B receives this report, it grants modulation and coding, number of codes, rank and the precoding channel indicator to each specific UE based on a scheduler metric.

Introduction of the 4-branch MIMO requires a new feedback channel structure to send the CQI/RI/PCI information to the Node B. To reduce the signaling overhead at DL (downlink) and uplink (UL), it has been recommended to use two codewords totaling 8 bits for the 4-branch MIMO. For uplink signaling channel such as HS-DPCCH (high speed dedicated physical control channel), it was agreed that all information should be sent in one subframe. This structure is valid when the UE preferred rank is equal to two, three, and four.

However, when the UE preferred rank is equal to one, the exact encoding details are not known. This is because when the UE preferred rank is one, the UE needs less than 8 bits to represent CQI. Hence mechanisms to map these bits to make 8 bits are desirable. In one or more aspects, techniques to encode the CQI information, when the UE preferred rank is one, are proposed. In one aspect, the codewords carrying the CQI information may be padded. In another aspect, the CQI may be repeated in the codewords.

For explanation purposes, the following are described:
Overviews of channel quality reporting;
Encoding/decoding when wireless terminal preferred rank is a particular value (e.g., one);
Generalized encoding/decoding.

FIG. 1 illustrates an example of messages exchanged between a BS (base station), e.g., Node B, and a wireless terminal (e.g., UE), during a typical call set up for a 2-branch MIMO (3GPP Rel-7). At 110, the Node B transmits a CPICH (common pilot channel). From the CPICH, the UE estimates the channel between it and the base station and computes the CQI and the PCI. At 120, the UE reports this information along with HARQ (hybrid automatic repeat request) ACK/NAK to the Node B as feedback using the HS-DPCCH. Once the Node B receives this feedback report, it allocates the required channelization codes, modulation and coding, precoding channel index to the UE after scheduling. At 130, this transmission control information is conveyed to the UE on a HS-SCCH (high speed shared control channel). Once the UE detects the HS-SCCH (high speed shared control channel), DL transmission starts at 140 through a data traffic channel using a HS-PDSCH (high speed physical downlink shared channel).

Figure 2:
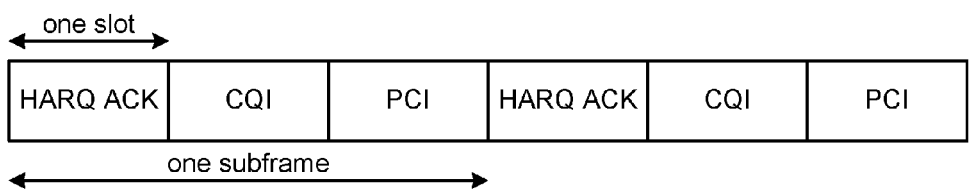
FIG. 2 illustrates an example slot format of a dedicated physical control channel for a single carrier.

Regarding the feedback provided from the UE to the Node B at 120, the periodicity of the HS-DPCCH is one subframe (2 msec). The structure of the HS-DPCCH for a single carrier is illustrated in FIG. 2. As seen, for each subframe, the first slot is filled with HARQ ACK information and the second and third slots are filled with CQI and PCI. For the 2-branch MIMO, the CQI is computed as:

$$CQI = \begin{cases} 15 \times CQI_1 + CQI_2 + 31 & \text{when 2 transport blocks are preferred by the UE} \\ CQI_s & \text{when 1 transport block is preferred by the UE} \end{cases} \quad (1)$$

In (1), the CQI may be said to represent the channel quality per individual layer.

From (1), it can be observed that if the CQI is less than 31, the preferred rank is one, otherwise the rank is two. PCI is the precoding information bits selected from a subset of the codebook corresponding to the rank information.

For the 4-branch MIMO, the UE informs the following to the Node B through the feedback channel:
HARQ ACK information—same structure that of Rel-7;
CQI per codeword—two codewords are defined in the standard (8 bits);
RI (rank information)—Indicates the number of layers that the UE prefers (2 bits);
PCI—precoding control indicator in the RI (4 bits).

Figure 3:
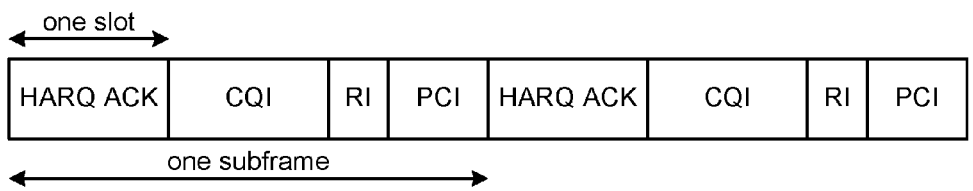
FIG. 3 illustrates an example slot format of a dedicated physical control channel for a 4-branch MIMO.

FIG. 3 illustrates a slot format for the HS-DPCCH for the 4-branch MIMO. As seen, based on the channel estimation, the UE conveys information about the CQI, the RI representing a preferred number of streams, and PCI corresponding to that preferred number of streams. In this context, streams, rank, transport block, and layers can be viewed as being synonymous with each other. Thus, the RI can also be understood as indicating the preferred rank.

Note that for feedback of the channel state estimation, the UE conveys the CQI/RI/PCI information, along with HARQ ACK, in one HS-DPCCH subframe. It can then be said that the HS-DPCCH subframe, which can be viewed as being an example of a feedback subframe, includes feedback fields allocated for feedback parameters CQI, RI and PCI. The UE can fill these feedback fields with feedback values when providing the feedback. In this disclosure, "field length" will be used to indicate an amount of space allocated in a feedback subframe such as the HS-DPCCH subframe for the feedback parameter corresponding to the feedback field. The field length is typically expressed in number of bits.

For Type A reporting, 8 information bits are used to describe the CQI information for both codewords, 2 bits are used to convey the rank information, and 4 bits are used to describe the PCI information. That is, the CQI field length is 8 bits (or two codewords), the RI field length is 2 bits, and the PCI field length is 4 bits.

Figure 4:
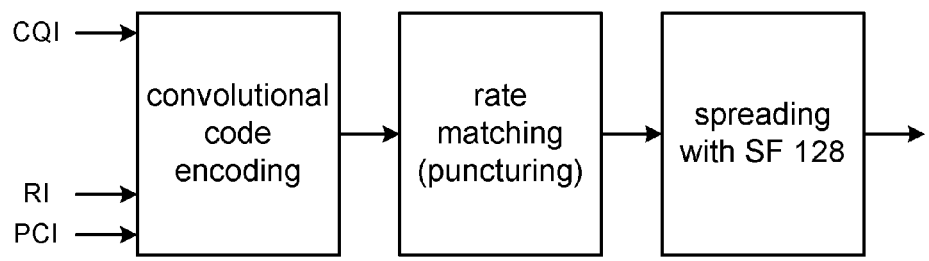
FIG. 4 illustrates a transmission diagram for type A reporting in 3GPP.

The UE determines the feedback values for the feedback parameters CQI, RI, and PCI from the channel estimation. The resulting 14 bit (8/2/4) CQI/RI/PCI feedback report (also referred to as the composite report) may be encoded with a convolutional code, and then rate matched to make 40 encoded bits. Rate matching is also referred to as puncturing. The information is spread with SF (spreading factor) of 128 for transmission as illustrated in FIG. 4.

In the design of HS-DPCCH, the CQI information is assumed to be 8 bits or two codewords in total. This assumption is valid when the UE preferred rank is two, three or four since the number of codewords is two for these ranks.

Hence each codeword is represented by 4 bits. However, when the UE preferred rank is one, the maximum number of bits the UE can represent for the CQI is 5. Then encoding of these bits is not clear.

To address these and other problems, one or more methods, apparatuses and/or systems are described herein in which one or more novel techniques to address the encoding of the CQI or any of the feedback parameters can be implemented. In one aspect, the CQI may be encoded through bit padding when the UE preferred rank is one. In another aspect, the CQI may be repeated.

In bit padding, the UE may choose CQI tables with a resolution of 5 bits. The UE can pad the 5 bit long CQI feedback value with 3 more bits to generate an extended CQI value, which may be referred to as eCQI value, of 8 bits to fill the two codewords allocated for the CQI feedback parameter. The resulting 14 bit (5+3/2/4) composite eCQI/RI/PCI report can be processed as usual. That is, the 14 feedback bits in the feedback subframe may be encoded, rate matched, and spread for transmission.

Figure 5:
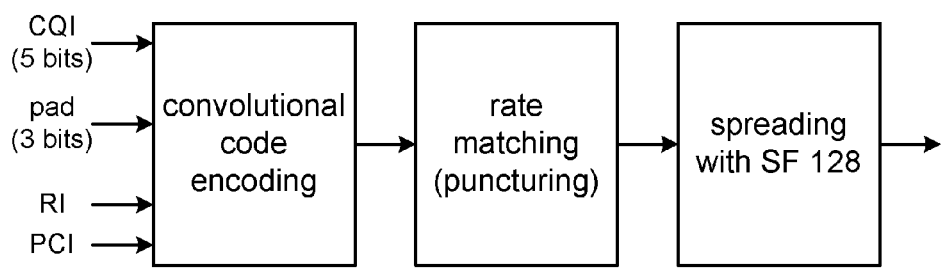
FIG. 5 illustrates a transmission diagram of an example feedback parameter bit padding technique.

FIG. 5 illustrates a transmission diagram for an example bit padding technique. The described bit padding may be viewed as an example way to generate the extended CQI value whose length is equal to the CQI field length of the HS-DPCCH subframe. In this way, the CQI feedback field can be properly filled.

In an alternative aspect, the CQI feedback value may be repeated. For CQI repeating, the UE can choose the CQI tables with a resolution of 4 bits when the preferred rank is one. The UE can repeat the 4 bit CQI feedback value to generate the 8 bit extended CQI value to fill the two codewords. The resulting 14 bit (4+4/2/4) composite eCQI/RI/PCI report in the feedback subframe may be encoded, rate matched, and spread for transmission.

Figure 6:
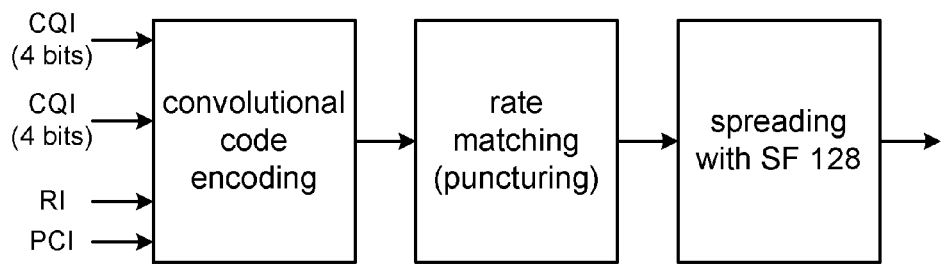
FIG. 6 illustrates a transmission diagram of an example feedback parameter repeating technique.

FIG. 6 illustrates a transmission diagram for an example CQI repeating technique. The described CQI value repeating may be viewed as another example way to generate the extended CQI value whose length is equal to the CQI field length of the HS-DPCCH subframe. Like bit padding, CQI value repeating technique also enables the CQI feedback field to be properly filled.

There are advantages and disadvantages to the bit padding and the CQI repeating techniques. Relative to the CQI value repeating, the bit padding is advantageous in that it allows higher resolutions for the CQI. Note that in bit padding, the UE can choose tables with a resolution of 5 bits compared to choosing tables with resolution of 4 bits with CQI value repeating. The higher resolution allows for better downlink performance through better link adaptation. Indeed, for bit padding, the resolution can go up to the number of bits allocated for the CQI feedback field in the feedback subframe.

However, the padded bits do not carry information, and the decoder at the base station (e.g., at Node B) cannot make use of the energy carried in the padded bits. But when the CQI value is repeated, the base station's decoder can use the repeated information. This makes CQI value repeating more energy efficient than bit padding.

Figure 7:
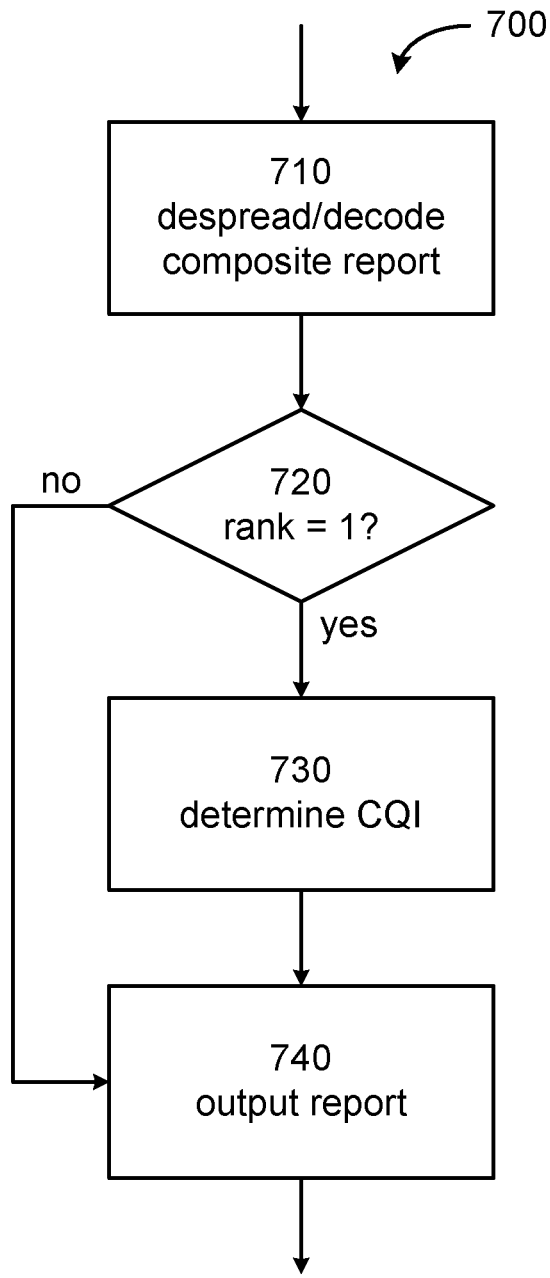
FIG. 7 illustrates a flow chart of an example method performed by a transmitting node to decode feedback report received from a receiving node.

FIG. 7 illustrates a flow chart of an example method that can be performed by the Node B's decoder to decode the feedback report received from the UE. The example method 710 may be described as follows:

Step 710: Extract the entire composite report from the feedback subframe;
Step 720: If the rank information is not equal to one, go to step 740;
Step 730: Extract the CQI value from the extended CQI value carried in the CQI field; and
Step 740: Output report.

Note that prior to receiving the feedback, the preferred rank is unknown to the decoder of the base station. Hence, prior to receiving the HS-DPCCH subframe, the decoder does not know before hand whether the the CQI field of the HS-DPCCH subframe will carry the actual CQI feedback value which simply can be retrieved or whether the CQI field will carry the extended CQI value that requires further processing to extract the CQI feedback value.

In one aspect, the decoder in step 710 can decode the HS-DPCCH subframe to extract the feedback subframe using a soft output decoder such as SOVA (soft out viterbi algorithm), log map algorithm, etc. In step 720, the decoded feedback subframe can be examined to determine whether the preferred rank is one, e.g., by examining the RI field. If the preferred rank something other than one, it can be assumed that the CQI field is filled with the actual CQI feedback (i.e., not extended) value. The method 700 then may proceed to step 740 in which a hard decision can be made based on the soft decoded values.

But when the rank is determined to be one in step 720, it may be assumed that the CQI field is filled with extended CQI value, the method 700 may proceed to step 730 where the eCQI value may be further processed to arrive at the soft values of the CQI bits. In bit padding, the decoder may strip the padded bits in step 730.

But in CQI value repeating, the decoder can benefit from the repeated useful information. In step 730 for CQI repeating, each of the corresponding bit pairs of the extended CQI value (e.g., bits 1 and 5, bits 2 and 6, bits 3 and 7, bits 4 and 8) can be processed to arrive at the soft values of the CQI bits. The corresponding bits are processed since they should carry the same information. For example, a combined LLR (log likelihood ratio) of the CQI bits may be arrived at by taking an average of the LLRs of the corresponding bits. This may be expressed as:

$$combinedLLR(i) = average(LLR(i), LLR(i+4)), i=1,2,3,4 \qquad (2)$$

According to (2), the combined LLR of the CQI bit 1 can be arrived at by averaging the LLRs of bits 1 and 5. Based on the combined LLR, a hard decision can be made for each of the CQI bits in step 740.

Note that LLRs are not the only values that can be averaged. Any type of soft output such as simple likelihood ratios can be averaged. Further, averaging is not the only processing option. The combined soft value can be arrived at through a function. This may be expressed as:

$$combinedSV(i) = f(SV(i), SV(i+4)), i=1,2,3,4 \qquad (3)$$

In (3), combinedSV(i) represents a combined soft value of the CQI bit i, $f$ represents a combining function, and SV(i) and SV(i+4) represent the decoded soft values of the corresponding bits of the extended CQI. After determining the combined soft values for the CQI bits 1-4 in step 730, hard bit values may be decided in step 740 along with RI and PCI values.

Note that while the function $f$ is expressed in a mathematical form, it should be taken in a broader sense. That is, the scope of (3) contemplates any process that receives one or more inputs, performs a transformation based on the received inputs, and outputs a result of that transformation. Mathematical operations or functions are simply some examples of such processes.

From the above description, it can be recognized that the HS-DPCCH subframe may be used by the UE to provide feedback report to the Node-B. Thus, the HS-DPCCH subframe maybe viewed as an example a feedback subframe. Generally, a feedback subframe may be described as a structure of a wireless channel for carrying feedback report between two radio nodes such as between a data receiving node and a data transmitting node.

The feedback subframe may include one or more feedback fields allocated for feedback parameters, i.e., allocated to carry feedback values of feedback parameters corresponding to the feedback fields. For each feedback field, a field length indicates the amount of resources allocated in the feedback subframe for the parameter corresponding to that feedback field.

For the 4-branch MIMO feedback described above, it is seen that the feedback subframe (e.g., HS-DPCCH subframe) is used to carry feedback report between two radio nodes (UE, Node-B). The feedback report may also be referred to as the composite report. The feedback subframe includes feedback fields (CQI field, RI field, PCI field) allocated for the corresponding feedback parameters (CQI, RI, PCI). The field lengths (CQI field length, RI field length, PCI field length) indicate the amount of resources allocated in the feedback Subframe for the corresponding parameters (8 bits, 2 bits, 4 bits). Preferably, the feedback subframe is a frame structure defined at the physical layer, which allows for a relatively fast response.

The techniques described above can be generalized to encoding and decoding any feedback parameters, not just the CQI. Also, more than one feedback parameter may be encoded and decoded at a time. The generalized techniques can apply to any parameter feedback value whose length is less than the field length of the corresponding feedback field allocated in the feedback subframe.

Also, the encoding/decoding techniques described herein may be implemented in any data receiving node (or simply receiving node) capable of providing feedback to a data transmitting node (or simply transmitting node) regarding a channel or channels between the receiving and transmitting nodes. The transmitting node in turn can decode the feedback report received from the receiving node. The transmitting node can provide transmission parameters (e.g., modulation and coding, precoding channel index, etc.) to the receiving node based on the feedback report.

Note that a node can perform the role of both the transmitting and the receiving node. The categorization simply reflects the direction of data transmission between any two nodes. For example, in the downlink, a base station (e.g., Node B, eNode B, eNB, relay station, micro/femto/pico BS, etc.) may be the transmitting node and a wireless terminal (UE, tablet, PDA, cell phone, etc.) may be the receiving node. In the uplink, the roles can be reversed.

Figure 8:
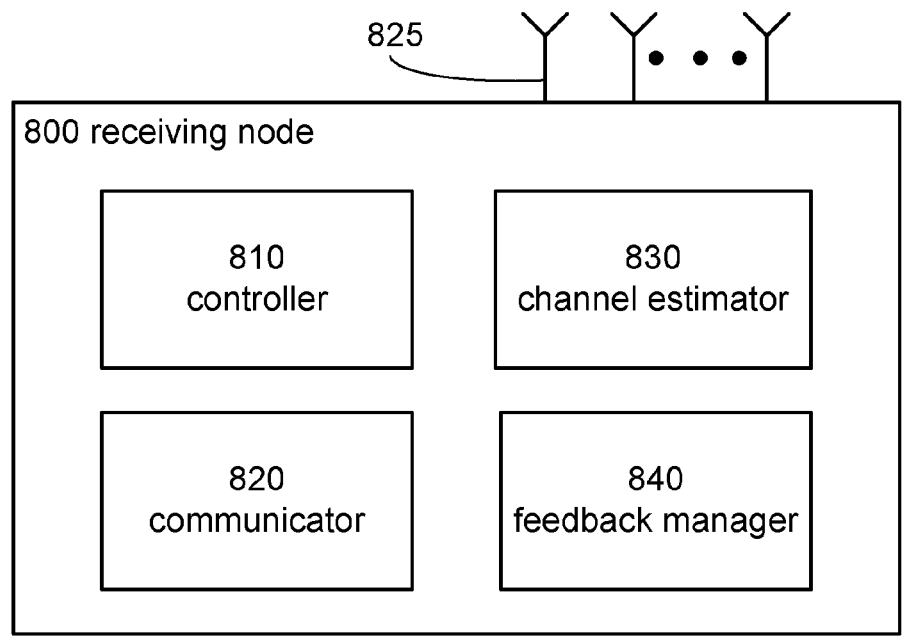
FIGS. 8 and 9 illustrate example embodiments of a receiving node structured to provide feedback to a transmitting node.

FIG. 8 illustrates an example embodiment of a receiving node 800 structured to provide feedback to a transmitting node 1300. The receiving node 800 may include a controller 810, a communicator 820, a channel estimator 830, and a feedback manager 840. The communicator 820 may be structured to perform wired and/or wireless communication with other nodes and/or wireless terminals including the transmitting node 1200. The channel estimator 830 may be structured to estimate or otherwise determine the channel or channels between a transmitting node 1300 and the receiving node 800, and to generate or otherwise determine channel state information, which may include one or more parameter values (e.g., CQI, preferred rank, PCI, etc.) each corresponding to a feedback parameter. The feedback manager 840 may be structured to fill a feedback subframe (e.g., HS DPCCH) based on the channel state information, and send the filled feedback subframe, possibly encoded, to the transmitting node 1200 via the communicator 820. The controller 810 may be structured to control the overall operation of the receiving node 800. Details of the components of the receiving node 800 will be provided in conjunction with the description of the operations performed by the receiving node 800 further below.

FIG. 8 provides a logical view of the receiving node 800 and the devices included therein. Each device may be implemented as a circuit. That is, there may be a controlling circuit, a communicating circuit, a channel estimating circuit, and an encoding circuit. Also, any combination of the devices may be implemented in a single circuit. Further, any one device may be implemented as a combination of two or more circuits.

The receiving node 800 can be implemented strictly in hardware. Alternatively, the receiving node 800 may be implemented as a combination of hardware and software. In this alternative, at least one device may implemented strictly in hardware or in a hardware and software combination. Each of the other devices may be purely software or a hardware and software combination such that on the whole, the receiving node 800 is a hardware and software combination.

Figure 9:
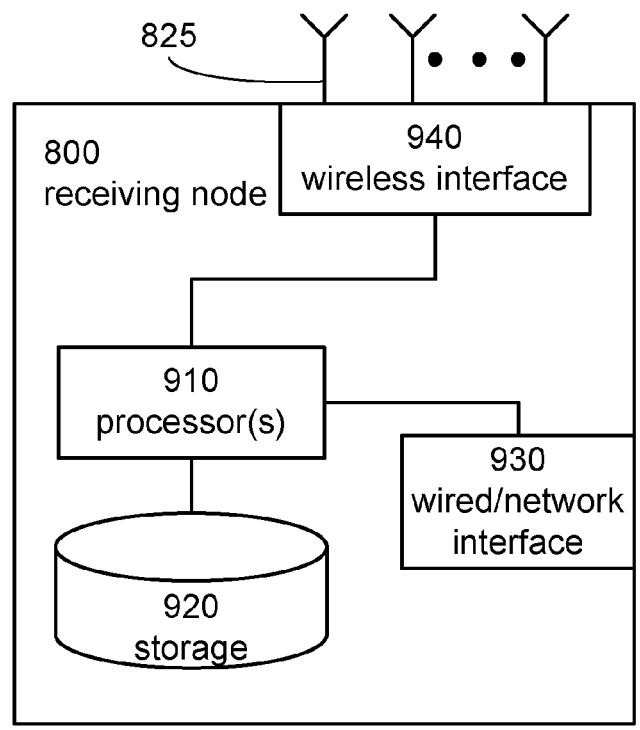

For example, as illustrated in FIG. 9, the receiving node 800 may include one or more hardware processors 910, hardware storage (internal, external, or both) 920, and one or both of a hardware wireless interface and a hardware network/wired interface. The processor(s) 910 may be structured to execute program instructions to perform the functions of one or more of the receiving node devices. The instructions may be stored in a non-transitory storage medium or in firmware (e.g., ROM, RAM, Flash) (denoted as storage 920). Note that the program instructions may also be received through wired and/or or wireless transitory medium via one or both of the wireless and network interfaces 940, 930. The wireless interface (e.g., a transceiver) 940 may be structured to perform wireless communications with other radio nodes via one or more antennas 825. The network/wired interface 930 may be structured to perform wired and/or wireless communications with other network nodes.

From the above description, it can be recognized that the HS-DPCCH subframe may be used by the UE to provide feedback report to the Node B. Thus, the HS-DPCCH subframe maybe viewed as an example a feedback subframe. Generally, a feedback subframe may be described as a structure of a wireless channel for carrying feedback report between two radio nodes such as between a data receiving node and a data transmitting node.

The feedback subframe may include one or more feedback fields allocated for feedback parameters, i.e., allocated to carry parameter values corresponding to the feedback parameters. For each feedback field, a feedback field length indicates the amount of resources allocated for that parameter in the feedback Subframe.

Figure 10:
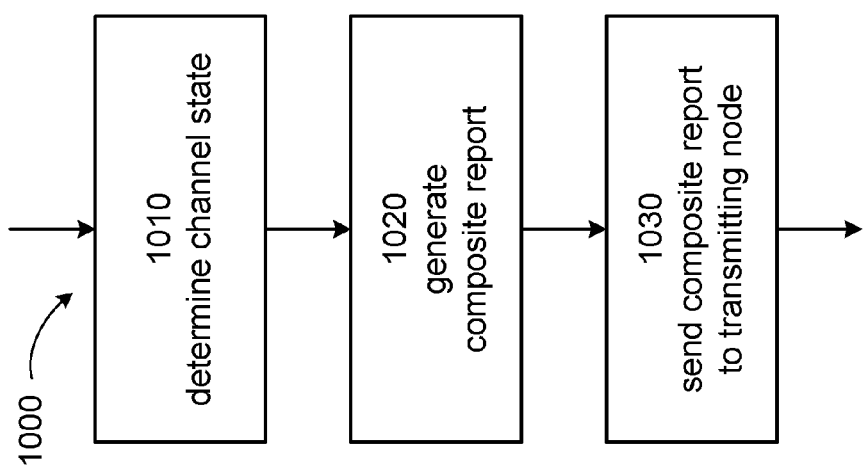
FIG. 10 is a flow chart of an example method performed by a receiving node to provide feedback to a transmitting node.

FIG. 10 illustrates a flow chart of an example method 1000 performed by the receiving node 800 to provide feedback to a transmitting node 1300 (described later in detail). For example, in the uplink, a wireless terminal (e.g., a UE) may be an example of the receiving node 800 and a base station (e.g., Node B) may be an example of the transmitting node 1300.

Recall that the Node B may provide a reference signal such as the CPICH signal for sounding purposes. In step 1010, the channel estimator 830 may estimate or other wise determine a channel state of a wireless channel between the transmitting node 1300 and the receiving node 800 based on the reference signal transmitted from the transmitting node 1300. The channel state may include a plurality of feedback parameters including at least one reference feedback parameter (e.g., RI parameter) and at least one other parameters. Each feedback parameter including the reference parameter may indicate a quality characteristic of the wireless channel as estimated by the channel estimator 830 of the receiving node 800 or may indicate a preference of the receiving node 800 in a transmission characteristic of data transmission from the transmitting node 1300.

In step 1020, the feedback manager 830 may fill a feedback subframe, e.g., HS-DPCCH subframe, based on the channel state to generate a composite report. The feedback subframe may include a plurality of feedback fields. There may be at least one reference feedback field among the plurality of feedback feedback field. In HSDPA, the RI field may be an example a reference feedback field. Each feedback field may correspond to one of the feedback parameters of the channel state, and may be allocated to carry a value of the corresponding feedback parameter. The feedback field length, or simply "field length" of each feedback field may be predetermined including the field length of the reference feedback field. Recall that the field length indicates an amount of space allocated in the feedback subframe for the corresponding parameter.

In one or more aspects, the feedback subframe may be such that when the feedback subframe is reconstructed at the transmitting node 1300, there is at least one feedback field in which further processing is required to determine whether that feedback field is carrying a feedback value or carrying an extended value. For a feedback field, a feedback value may be viewed as being the value of the feedback parameter corresponding to that feedback field, and an extended value may be viewed as a value that requires further processing to extract the feedback value.

In the HSDPA examples, the value in the PCI field is the feedback value of the PCI parameter, i.e., the PCI field may always carry a value of the PCI parameter. Similarly, the RI field may always carry a value of the RI parameter. However, the CQI may carry either a value of the CQI parameter itself or may carry an extended CQI, also referred to as eCQI, value which should be further processed to extract the actual CQI parameter value.

Figure 11:
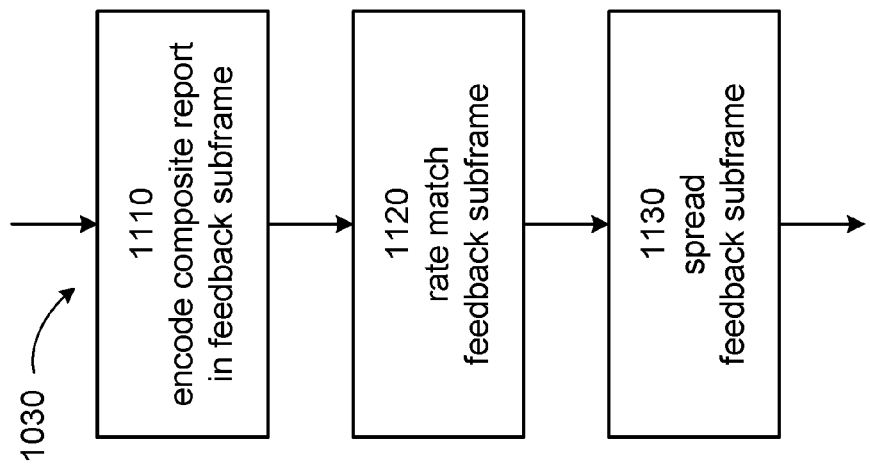
FIG. 11 is a flow chart of an example process performed by a receiving node to send a feedback subframe.

In step 1030, the communicator 820 may send a feedback signal, which includes the feedback subframe, to the transmitting node 1300. In one embodiment, the feedback signal may be transmitted over a feedback channel, e.g., over the HS-DPCCH. FIG. 11 illustrates a flow chart of an example process performed by the communicator 820 to implement step 1030. In step 1110, the information in the feedback subframe, i.e., the composite report, may be encoded. In step 1120, the encoded feedback subframe may be rate matched. In step 1130, the rate matched (or punctured) feedback subframe may be spread by a spread factor for transmission.

Figure 12:
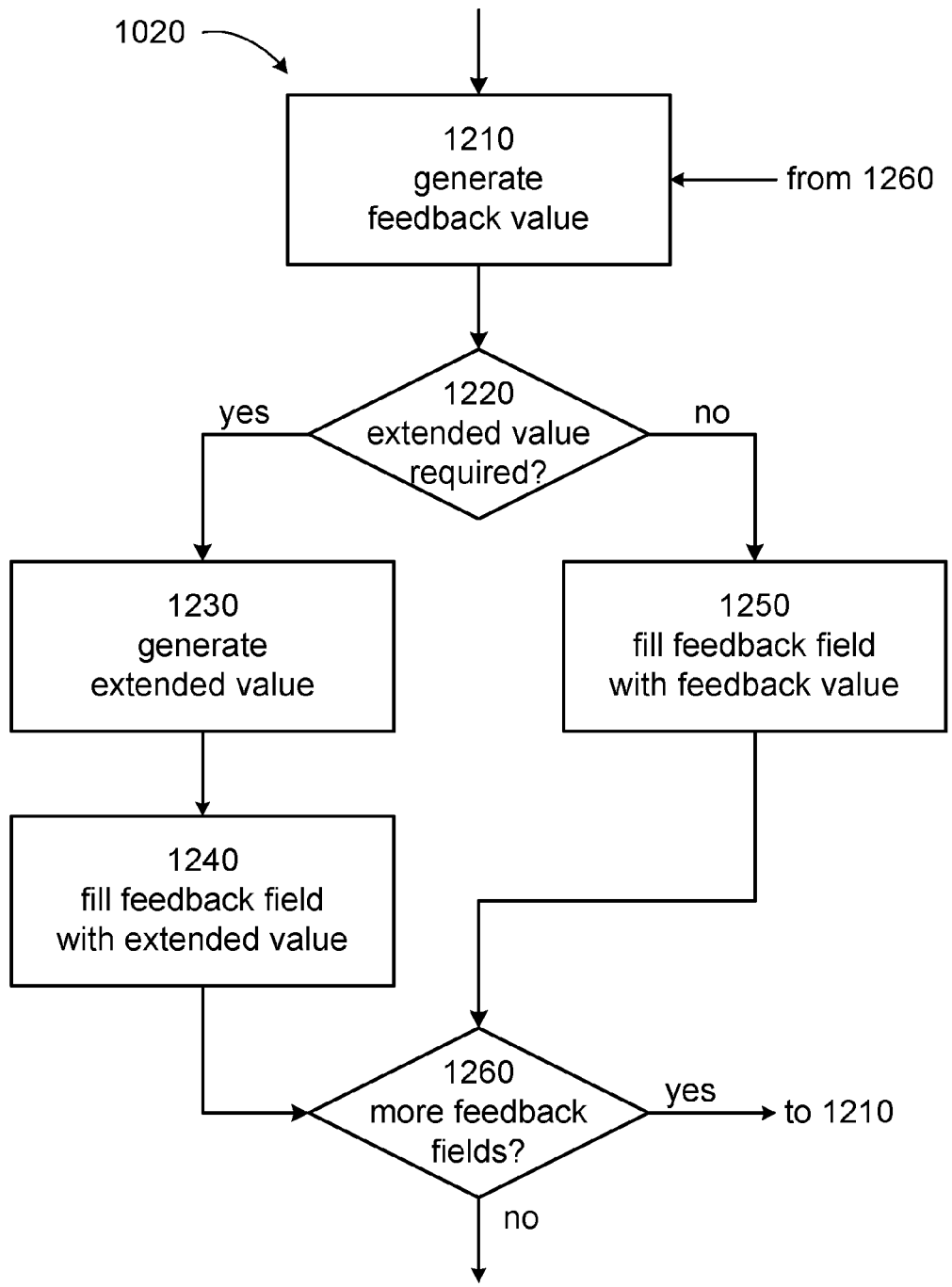
FIG. 12 is a flow chart of an example process performed by a receiving node to fill a feedback subframe.

Referring back to FIG. 10, it is indicated that in step 1020, the feedback manager 840 of the receiving node 800 may fill the feedback subframe, i.e., generate the composite report, based on the channel state determined by the channel estimator 830. FIG. 12 illustrates a flow chart of an example process performed by the feedback manager 840 to implement this step.

In step 1210, the feedback manager 840 may generate, for each feedback field, the feedback value of the feedback parameter corresponding to that feedback field. For example, for the CQI, RI and PCI fields, the corresponding values of CQI, RI and PCI parameters may be generated. Recall that the feedback value is the actual value of the feedback parameter.

In step 1220, the feedback manager 840 may determine, for at least one feedback field, whether an extended value is required for the feedback parameter corresponding to that feedback field. Recall that the extended value is to be differentiated from the feedback value in that the further processing is necessary to extract the feedback value from the extended value.

In one aspect, the feedback manager 840 may determine that the extended value is required for a feedback field when a feedback value of a reference feedback parameter is equal to a reference value. For example, in the HSDPA examples given above, the RI parameter may serve as the reference feedback parameter. Then in step 1220, the feedback manager 840 may determine that the eCQI value is required when the RI parameter value equals one (RI=1 being the reference value of the reference feedback parameter). Note that the reference parameter (e.g., RI parameter) is different from the feedback parameter (e.g., CQI parameter) corresponding to that feedback field.

While the test in this implementation example of step 1220 tests whether the value of the reference parameter equals the reference value, this should not be taken in a limiting sense. There may be more than one reference value for that reference parameter. Also, there may be a range of reference values. In this instance, if the value of the reference parameter falls within the range of reference values, it may be said that the value of the reference parameter "equals" the reference value.

In another aspect, the feedback manager 840 may determine that the extended value is required for a feedback field when a length of the feedback value of the feedback parameter corresponding to the feedback field is less than the field length of the feedback field. For example, note that when the rank is greater than one, the feedback manager 840 may generate a CQI value that is 8 bits long in step 1210. Since 8 bits is same as the field length of the CQI field, in this instance, the feedback manager 840 may determine that the eCQI is not required in step 1220. On the other hand, when the rank is one, the feedback manager 840 may generate a CQI value that is 4 or 5 bits long in step 1210. Since this is not the same as the field length of 8 bits, the feedback manager 840 may determine that the eCQI is required in step 1220.

For each feedback field that has been determined to require the extended value, the feedback manager 840 in step 1230 may generate the extended value for the feedback parameter corresponding to that feedback field. Preferably, the feedback manager 840 generates the extended value such that its length is equal to the field length of the corresponding feedback field. Note that the length of the extended value is different from a length of the feedback value of the corresponding feedback parameter generated in step 1210.

In one implementation of step 1230, the feedback manager 840 may pad the feedback value of the feedback parameter with sufficient number of bits such that the length of the padded feedback value is equal to the field length of that feedback field. The padded feedback value may be viewed as being the extended value. In the HSDPA example, when the rank is one, the feedback manager 840 may pad the CQI value generated in step 1210 with additional bits in step 1230 such that the padded CQI value—the eCQI value—is 8 bits long.

In an alternative implementation of step 1230, the feedback manager 840 may repeat the feedback value of the feedback parameter at least once, and the repeated feedback value may be viewed as being the extended value. In the HSDPA example, when the rank is one, the feedback manager 840 may repeat the CQI value generated in step 1210. When the CQI value is 4 bits long, the repeated CQI value—the eCQI value—is 8 bits long.

When the feedback value is such that a resolution of possible values is greater than half of the field length of the corresponding field, then the padding implementation may be preferred over the value repeating implementation. For example, in the HSDPA, if the feedback manager 840 generates a 5-bit CQI value in step 1210, then the feedback manager 840 may pad the other 3 bits in step 1230 to generate the eCQI value.

However, when the resolution of possible values is half of the field length or less, then the value repeating implementation may be preferred over the padding. For example, in the HSDPA, if the feedback manager 840 generates a 4-bit CQI value in step 1210, the feedback manager 840 may repeat the CQI value to generate the 8-bit eCQI value. In this way, all of bits of the CQI field in the feedback subframe can carry useful information.

It should be noted that the above implementations may be combined. For example, for a feedback field, the field length may be a non-integer multiple of the length of the feedback value generated in step 1210 (e.g., field length may be 8 bits and the feedback value may be 3 bits). In this instance, the feedback manager 840 in generating the extended value may repeat the feedback value once and pad the remaining 2 bits.

Regarding the value repeating implementation, it is preferred that the field length of the feedback field be an integer multiple of the length of the feedback value. However, it is also possible to implement a partial value repeating when the field length is not an integer multiple. As an illustration, when the feedback manager 840 generates a 5-bit CQI value in step 1210, then in step 1230, instead of padding the 3 bits, the feedback manager 840 may partially repeat (e.g., most significant 3 bits, least significant 3 bits, etc.) such that all bits in the CQI field of the feedback subframe can carry useful information. Note that even when partial repeating is used, this does not mean that every bit of the feedback field must be used to carry useful information. That is, some bits still may be padded.

In step 1240, for each feedback field for which the extended value has been generated, the feedback manager 840 may fill that feedback field with the extended value of the corresponding feedback parameter. Here, the length of the feedback value of the feedback parameter corresponding to that feedback field will be less than the field length of that feedback field. However, the length of the extended value should be equal to the field length of the feedback field.

In step 1250, for each feedback field for which the extended value has not been generated, the feedback manager 840 may fill that feedback field with the feedback value of the corresponding feedback parameter. Here, the length of the feedback value should be equal to the field length of the feedback field.

In 3GPP, the feedback parameters of the channel state may include, among others, a channel quality indicator, a rank indicator, and a precoding control indicator parameters. The channel quality indicator may represent a quality of the wireless channel between the transmitting node 1300 and the receiving node 800 as estimated by the channel estimator 830 of the receiving node 800. The rank indicator may represent a rank of data transmission preferred by the processor 810 of the receiving node 800 for data transmissions of data from the transmitting node 1300. The precoding control indicator may represent a precoding code applicable to the preferred rank. In this instance, the feedback subframe (e.g., HS-DPCCH subframe) may include a channel quality indicator field, a rank indicator field, and a precoding control indicator field respectively corresponding to the channel quality indicator, the rank indicator, and the precoding control indicator parameters.

In step 1220, the feedback manager 840 may determine that the extended value is required for the channel quality indicator when it is determined that the rank indicator value (feedback value of the reference feedback parameter) is equal to one (equal to a reference value). When it is determined that the extended value is required for the channel quality indicator, the feedback manager 840 in step 1230 may generate the extended channel quality indicator value by padding the channel quality indicator value with additional bits so as to sufficiently fill the channel quality indicator field of the feedback subframe. Alternatively, the feedback manager 840 in step 1230 may generate the extended channel quality indicator value by repeating such that the extended channel quality indicator includes multiple copies of the channel quality indicator. Of course, combination may be used including partial repeating to generate the extended channel quality indicator value. The feedback manager 840 may fill the channel quality indicator field of the feedback subframe with the generated extended channel quality indicator value in step 1240.

When it is determined that the extended channel quality indicator value is not required, the feedback manager 840 may fill the channel quality indicator field of the feedback subframe with the feedback channel quality indicator value in step 1250.

For the rank indicator and precoding control indicator parameters, the feedback manager 840 may generate the feedback rank indicator and the feedback precoding control indicator values in step 1210, and fill the rank indicator and the precoding control indicator fields of the feedback subframe with the generated values in step 1250.

Figure 13:
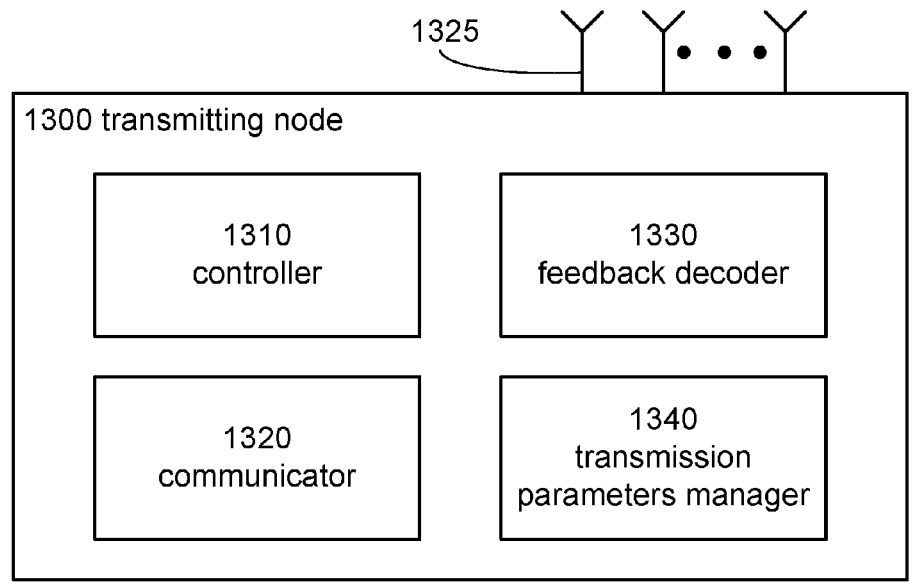
FIGS. 13 and 14 illustrate example embodiments of a transmitting node.

FIG. 13 illustrates an example embodiment of a transmitting node 1300. The transmitting node 1300 may include a controller 1310, a communicator 1320, a feedback decoder 1330, and a transmission parameters manager 1340. The communicator 1320 may be structured to perform wired and/or wireless communication with other nodes and/or wireless terminals including the receiving node 800. The feedback decoder 1330 may be structured to receive a feedback subframe (e.g., HS-DPCCH) via the communicator 1320 and extract parameter value(s) (e.g., CGI, preferred rank, PCI) from feedback fields of the feedback subframe. The transmission parameters manager 1340 may be structured to provide transmission parameters to the receiving node 800 via the communicator 1320. The controller 1310 may be structured to control the overall operation of the transmitting node 1300. Details of the components of the transmitting node 1300 will be provided in conjunction with the description of the operations performed by the transmitting node 1300 further below.

FIG. 13 provides a logical view of the transmitting node 1300 and the devices included therein. Each device may be implemented as a circuit. That is, there may be a controlling circuit, a communicating circuit, a channel estimating circuit, and an encoding circuit. Also, any combination of the devices may be implemented in a single circuit. Further, any one device may be implemented as a combination of two or more circuits.

The transmitting node 1300 can be implemented strictly in hardware. Alternatively, the transmitting node 1300 may be implemented as a hardware/software combination. In this alternative, at least one device may implemented strictly in hardware or in a hardware and software combination. Each of the other devices may be purely software or a hardware and software combination such that on the whole, the transmitting node 1300 is a hardware and software combination.

Figure 14:
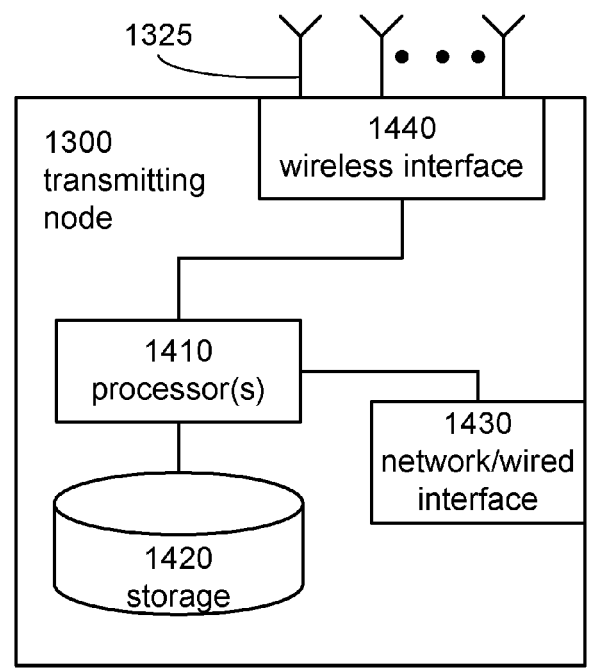

For example, as illustrated in FIG. 14, the transmitting node 1300 may include one or more hardware processors 1410, hardware storage (internal, external, or both) 1420, and one or both of a hardware wireless interface and a hardware network/wired interface. The processor(s) 1410 may be structured to execute program instructions to perform the functions of one or more of the transmitting node devices. The instructions may be stored in a non-transitory storage medium or in firmware (e.g., ROM, RAM, Flash) (denoted as storage 1420). Note that the program instructions may also be received through wired and/or or wireless transitory medium via one or both of the wireless and network interfaces 1440, 1430. The wireless interface (e.g., a transceiver) 1440 may be structured to perform wireless communications with other radio nodes via one or more antennas 1325. The network/wired interface 1430 may be structured to perform wired and/or wireless communications with other network nodes.

Figure 15:
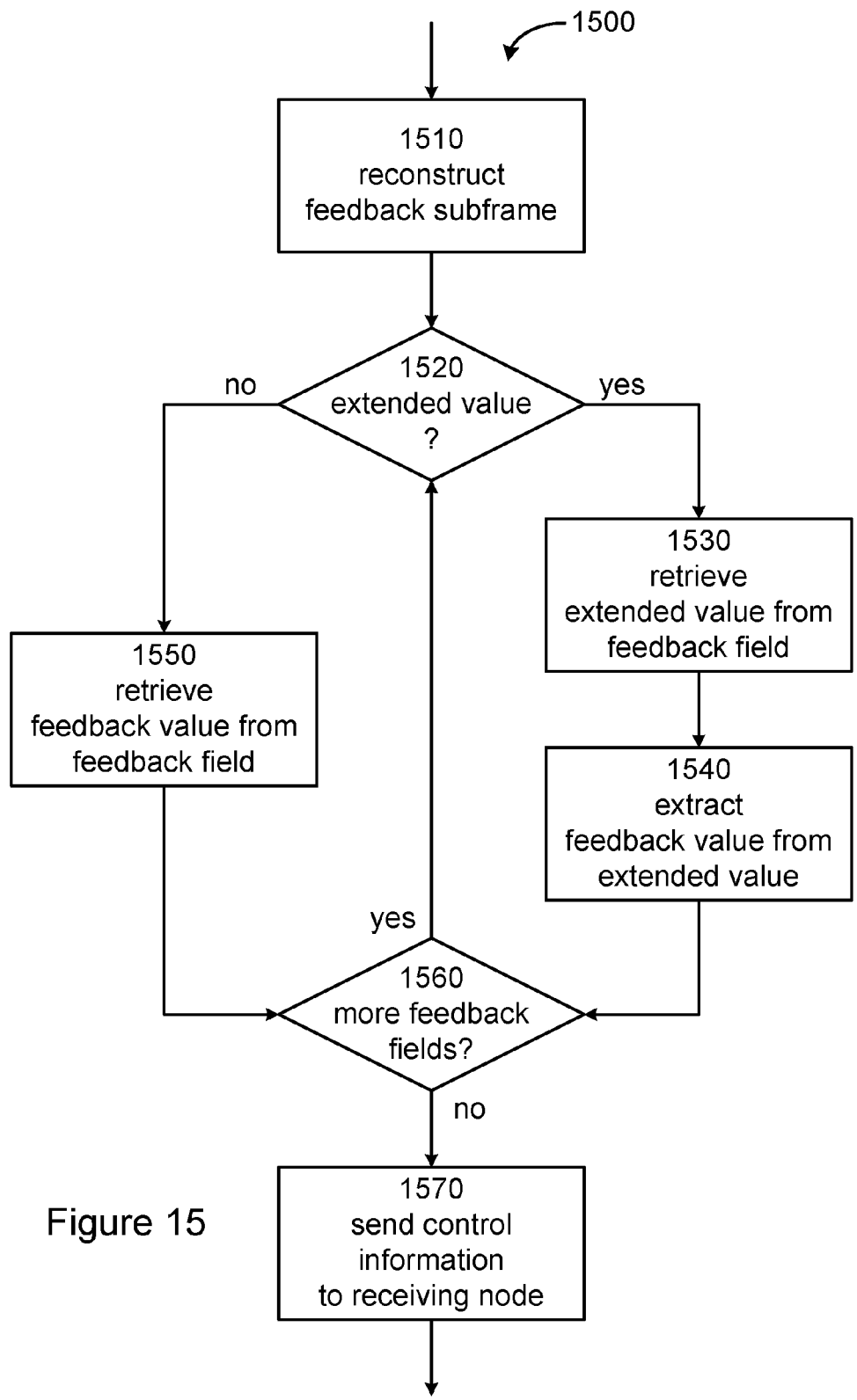
FIG. 15 is a flow chart of an example method performed by a transmitting node receive feedback report from a receiving node and to send transmission control information in response.

FIG. 15 illustrates a flow chart of an example method 1500 performed by the transmitting node 1300 to provide transmission parameters to the receiving node 800. Recall that in step 1030, the receiving node 800 may provide a feedback signal to the transmitting node 1300 over a feedback channel, and the feedback signal may include a feedback subframe. In step 1510, the feedback decoder 1330 may reconstruct the feedback subframe from the received feedback signal.

Figure 16:
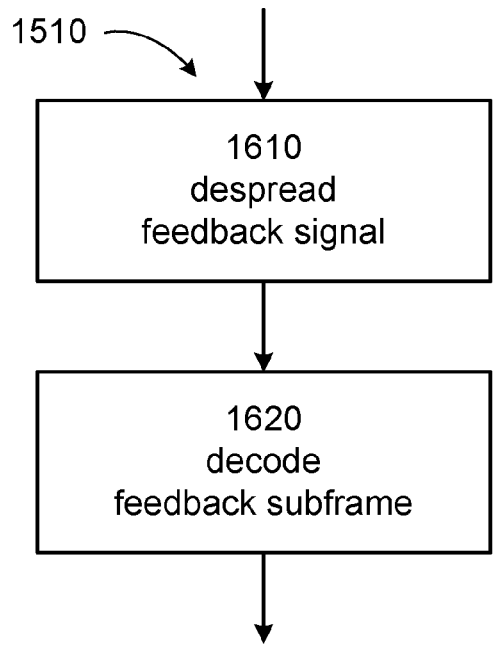
FIG. 16 is a flow chart of an example process performed by a transmitting node to decode feedback signal received from a receiving node.

FIG. 16 illustrates a flow chart of an example process performed by the feedback decoder 1330 to implement step 1510. Recall that in steps 1110-1130, the receiving node 800 encodes and spreads the feedback subframe. As illustrated in FIG. 16, the feedback decoder 1330 essentially may reverse these steps to reconstruct the subframe. In step 1610, the feedback decoder 1330 may despread the received feedback signal, and in step 1620, decode the feedback subframe.

Referring back to FIG. 15, in step 1520, the transmission parameters manager 1340 may determine, for at least one feedback field of the feedback subframe, whether there is at least one feedback whether that feedback field is carrying an extended value or a feedback value of the feedback parameter corresponding to that feedback field. For example, the transmission parameters manager 1340 may determine whether or not the CQI field is carrying the feedback CQI value or the extended CQI value.

In one aspect, the transmission parameters manager 1340 may determine, for a feedback field, that feedback field is carrying the extended value when a value carried in a reference feedback field is equal to a reference value. For example, in HSDPA, the transmission parameters manager 1340 may determine that the CQI field is carrying the eCQP value when the value in the RI field is equal to one. On the other hand, when the value in the reference feedback field is not equal to the reference value, the transmission parameters manager 1340 may determine that the feedback field is carrying the feedback value. For example, when the value in the RI field is equal to 2, 3 or 4, the transmission parameters manager 1340 may determine that the CQI field is carrying the feedback CQI value.

For each feedback field that has been determined to carry the extended value, the transmission parameters manager 1340 may retrieve the extended value from that feedback field in step 1530, and extract the feedback value of the feedback parameter corresponding to that feedback field from the extended value in step 1540. Note that length of the extended value is equal to the field length of that feedback field, and a length of the extracted feedback value is less than the field length of that feedback field. In one implementation of step 1540, the transmission parameters manager 1340 may strip off the padded bits of the extended value to extract the feedback value. For example, in HSDPA, when the RI field indicates that the receiving node's preferred rank is one, then the transmission parameters manager 1340 may strip off 3 or 4 bits (depending on whether the CQI value is 5 or 4 bits) to arrive at the feedback CQI value in step 1540.

Figure 17:
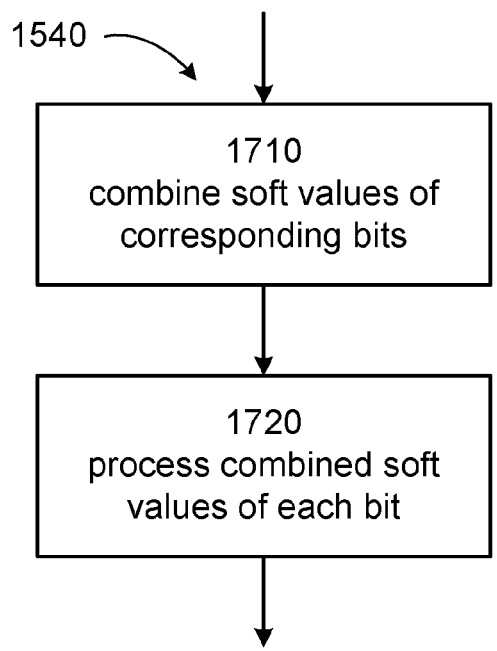
FIG. 17 is a flow chart of an example process performed by a transmitting node to process an extended value carried in a feedback field in a feedback subframe.

In another implementation, when the extended value is formed at the receiving node 800 through value repeating, the transmission parameters manager 1340 in 1540 may process the corresponding bits of the feedback value repeated in the extended value. FIG. 17 illustrates a flow chart of an example process performed by the transmission parameters manager 1340 to process the corresponding repeating bits. Here, it may be assumed that the feedback decoder 1330 in step 1510 reconstructed the feedback subframe through soft-decoding the feedback signal in steps 1610, 1620 such that the reconstructed feedback subframe includes soft values. The transmission parameters manager 1340 may combine the soft values of the corresponding bits of the feedback value repeated in the extended value in step 1710, and process the combined soft bit values to arrive at hard bit values for the feedback value in step 1720. Note that if a combination of padding and value repeating is used at the receiving node 800, a complementary combination of stripping and soft bits processing should be used at the transmission node 1300.

In step 1550, for each feedback field determined to carry the feedback value of the parameter corresponding to that feedback field, the transmission parameters manager 1340 may simply retrieve the feedback value from that feedback field. Here, the length of the feedback value should be equal to the field length of that feedback field.

Based on the feedback values (either retrieved from the feedback fields or extracted from extended values), the transmission parameters manager 1340 may send, via the communicator 1320, the transmission control information to the receiving node 800 in step 1570. The transmission control information may specify transmission characteristics that will be applied by the transmitting node 1300 in transmitting data to the receiving node 800. Examples of transmission characteristics include modulation, coding rate, rank, and so on.

In 3GPP, the transmission parameters manager 1340 in step 1520 may determine that the channel quality indicator field of the feedback subframe is carrying the extended channel quality indicator value when the value carried in the rank indicator field is equal to a reference value, e.g., equal to one. When it is so determined, then the transmission parameters manager 1340 in step 1540 may extract the feedback channel quality indicator value by stripping off the padded bits from the extended channel quality indicator value. Alternatively, the transmission parameters manager 1340 in step 1240 may process the corresponding bits of feedback channel quality indicator value repeated in the extended channel quality indicator value. Of course, combination may be necessary when the receiving node generates the extended channel quality indicator value through a combination of padding and value repeating.

When it is determined that the channel quality indicator field is carrying the feedback channel quality indicator value in step 1520, the transmission parameters manager 1340 may retrieve the feedback channel quality indicator value from the channel quality indicator field in step 1540.

For the rank indicator and precoding control indicator parameters, the transmission parameters manager 1340 may retrieve the feedback rank indicator and the feedback precoding control indicator values in step 1550 from the respective fields of the feedback subframe.

There are many advantages associated with one or more aspects of the disclosed subject matter. A non-exhaustive list of advantages include:

Conserve power consumption at the UE when using bit padding;

Enhance reliability when using value repeating.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a receiving node of a wireless communication system to provide feedback to a transmitting node, the method comprising:
    determining a channel state of a wireless channel between the transmitting node and the receiving node based on a reference signal transmitted from the transmitting node, the channel state comprising a plurality of feedback parameters, each feedback parameter indicating a quality characteristic of the wireless channel as estimated by the receiving node or indicating a preference of the receiving node in a transmission characteristic of data transmission from the transmitting node;
    filling a feedback subframe based on the channel state, the feedback subframe comprising a plurality of feedback fields, each feedback field corresponding to one of the plurality of feedback parameters of the channel state and allocated to carry a value of a corresponding feedback parameter, and a field length of each feedback field being predetermined, wherein filling the feedback subframe comprises:
    for each feedback field, generating a feedback value of the corresponding feedback parameter;
    for at least one feedback field, determining whether an extended value is required for the corresponding feedback parameter;
    for each feedback field that has been determined to require the extended value, generating the extended value for the corresponding feedback parameter, a length of the extended value being equal to the field length of that feedback field and different from a length of the feedback value of the corresponding feedback parameter;
    for each feedback field for which the extended value has been generated, filling that feedback field with the extended value of the corresponding feedback parameter; and
    for each feedback field for which the extended value has not been generated, filling that feedback field with the feedback value of the corresponding feedback parameter,
    wherein for each feedback field for which the extended value has been generated, a length of the corresponding feedback parameter's extended value is equal to the field length of that feedback field, and a length of the corresponding feedback parameter's feedback value is less than the field length of that feedback field, and
    wherein for each feedback field for which the extended value has not been generated, a length of the corresponding feedback parameter's feedback value is equal to the field length of that feedback field; and
    sending a feedback signal to the transmitting node over a feedback channel, the feedback signal including the feedback subframe,
    wherein the feedback subframe is such that upon reconstruction of the feedback subframe at the transmitting node, for at least one feedback field, further processing is required to determine whether that feedback field is carrying the feedback value or carrying the extended value of the corresponding feedback parameter, and
    wherein the feedback value is the value of the corresponding feedback parameter, and the extended value is a value that requires further processing to extract the feedback value.

2. The method of claim 1, wherein the step of determining whether the extended value is required for the feedback parameter corresponding to the feedback field comprises determining that the extended value is required when a feedback value of a reference feedback parameter is equal to a reference value, the reference feedback parameter being different than the feedback parameter corresponding to the feedback field.

3. The method of claim 1, wherein the step of generating the extended value for the feedback parameter corresponding to the feedback field comprises:
    padding the feedback value of the corresponding feedback parameter with sufficient number of bits such that the length of the padded feedback value is equal to the field length of that feedback field,
    wherein the padded feedback value is the extended value.

4. The method of claim 3, wherein the step of generating the feedback value of the feedback parameter corresponding to that feedback field comprises generating the feedback value with a resolution of possible values that is greater than half of the field length of that feedback field.

5. The method of claim 1,
    wherein the plurality of feedback parameters of the channel state include a channel quality indicator, a rank indicator, and a precoding control indicator, the channel quality indicator representing a quality of the wireless channel between the transmitting node and the receiving node as estimated by the receiving node, the rank indicator representing a rank of data transmission preferred by the receiving node for data transmissions of data from the transmitting node, and the precoding control indicator representing a precoding code applicable to the preferred rank,
    wherein the feedback subframe comprises a channel quality indicator field, a rank indicator field, and a precoding control indicator field respectively corresponding to the channel quality indicator, the rank indicator, and the precoding control indicator parameters, wherein the step of determining the extended value is required for the channel quality indicator comprises determining that an extended channel quality indicator is required when it is determined that the rank indicator is equal to one, and wherein the step of generating the extended channel quality indicator value comprises padding the channel quality indicator value with additional bits so as to sufficiently fill the channel quality indicator field of the feedback subframe.

6. A method performed at a transmitting node of a wireless communication system to provide transmission control information to a receiving node, the method comprising:

reconstructing a feedback subframe from a feedback signal received from the receiving node over a feedback channel, the feedback subframe comprising a plurality of feedback fields, each feedback field corresponding to one of a plurality of feedback parameters and allocated to carry a value of a corresponding feedback parameter, and a field length of each feedback field being predetermined;

for at least one feedback field, determining whether that feedback field is carrying an extended value or a feedback value of the corresponding feedback parameter, the feedback value being a value of the corresponding feedback parameter, and the extended value being a value that requires further processing to extract the feedback value;

for each feedback field determined to carry the extended value, retrieving the extended value from that feedback field, and extracting the feedback value of the corresponding feedback parameter from the extended value, wherein extracting the feedback value of the corresponding feedback parameter from the extended value comprises stripping off padded bits from the extended value;

for each feedback field determined to carry the feedback value, retrieving the feedback value of the corresponding feedback parameter from that feedback field; and sending the transmission control information to the receiving node based on the feedback values, the transmission control information specifying transmission characteristics that will be applied by the transmitting node in transmitting data to the receiving node.

7. The method of claim 6, wherein for each feedback field from which the extended value has been retrieved, a length of the extended value is equal to the field length of that feedback field, and a length of the extracted feedback value is less than the field length of that feedback field, and wherein for each feedback field from which the feedback value has been retrieved, a length of the feedback value is equal to the field length of that feedback field.

8. The method of claim 6, wherein the step of determining whether the feedback field is carrying the extended value or the feedback value of the corresponding feedback parameter comprises:

determining that the feedback field is carrying the extended value when it is determined that a value carried in the reference feedback field is equal to a reference value and determining that the feedback field is carrying the feedback value when the value carried in the reference feedback field is not equal to the reference value.

9. The method of claim 7, wherein the plurality of feedback parameters include a channel quality indicator, a rank indicator, and a precoding control indicator, the channel quality indicator representing a quality of the wireless channel between the transmitting node and the receiving node as estimated by the receiving node, the rank indicator representing a rank of data transmission preferred by the receiving node for data transmissions of data from the transmitting node, and the precoding control indicator representing a precoding code applicable to the preferred rank, wherein the feedback subframe comprises a channel quality indicator field, a rank indicator field, and a precoding control indicator field respectively corresponding to the channel quality indicator, the rank indicator, and the precoding control indicator parameters, wherein the step of determining whether the feedback field is carrying the extended value comprises determining that the channel quality indicator field is carrying an extended channel quality indicator when it is determined that the feedback value of the rank indicator field indicates that the receiving node preferred rank is equal to one, and wherein the step of extracting the channel quality indicator comprises stripping off padded bits of the extended channel quality indicator value carried in the channel quality indicator field of the feedback subframe.

10. A receiving node of a wireless communication system structured to provide feedback to a transmitting node, the receiving node comprising:

a channel estimator structured to determine a channel state of a wireless channel between the transmitting node and the receiving node based on a reference signal transmitted from the transmitting node, the channel state comprising a plurality of feedback parameters, each feedback parameter indicating a quality characteristic of the wireless channel as estimated by the receiving node or indicating a preference of the receiving node in a transmission characteristic of data transmission from the transmitting node;

a feedback manager structured to fill a feedback subframe based on the channel state, the feedback subframe comprising a plurality of feedback fields, each feedback field corresponding to one of the plurality of feedback parameters of the channel state and allocated to carry a value of the corresponding feedback parameter, and a field length of each feedback field being predetermined, wherein in order to fill the feedback subframe, the feedback manager is structured to:

for each feedback field, generate a feedback value of the corresponding feedback parameter;

for at least one feedback field, determine whether an extended value is required for the corresponding feedback parameter;

for each feedback field that has been determined to require the extended value, generate the extended value for the corresponding feedback parameter, a length of the extended value being equal to the field length of that feedback field and different from a length of the feedback value of the corresponding feedback parameter;

for each feedback field for which the extended value has been generated, fill that feedback field with the extended value of the corresponding feedback parameter; and for each feedback field for which the extended value has not been generated, fill that feedback field with the feedback value of the corresponding feedback parameter, wherein for each feedback field for which the extended value has been generated, a length of the corresponding feedback parameter's extended value is equal to the field length of that feedback field, and a length of the corresponding feedback parameter's feedback value is less than the field length of that feedback field, and wherein for each feedback field for which the extended value has not been generated, a length of the corresponding feedback parameter's feedback value is equal to the field length of that feedback field; and a communicator structured to send a feedback signal to the transmitting node over a feedback channel, the feedback signal including the feedback subframe, wherein the feedback subframe is such that upon reconstruction of the feedback subframe at the transmitting node, for at least one feedback field, further processing is required to determine whether that feedback field is carrying the feedback value or carrying the extended value of the corresponding feedback parameter, and wherein the feedback value is the value of the corresponding feedback parameter, and the extended value is a value that requires further processing to extract the feedback value.

11. The receiving node of claim 10, wherein the feedback manager is structured to determine that the extended value is required when a feedback value of a reference feedback parameter is equal to a reference value, the reference feedback parameter being different than the feedback parameter corresponding to the feedback field.

12. The receiving node of claim 10,
wherein in order to generate the extended value for the feedback parameter corresponding to the feedback field, the feedback manager is structured to pad the feedback value of the corresponding feedback parameter with sufficient number of bits such that the length of the padded feedback value is equal to the field length of that feedback field, and
wherein the padded feedback value is the extended value.

13. The receiving node of claim 12, wherein the feedback manager is structured to generate the feedback value with a resolution of possible values that is greater than half of the field length of that feedback field.

14. The receiving node of claim 10,
wherein the plurality of feedback parameters of the channel state include a channel quality indicator, a rank indicator, and a precoding control indicator, the channel quality indicator representing a quality of the wireless channel between the transmitting node and the receiving node as estimated by the receiving node, the rank indicator representing a rank of data transmission preferred by the receiving node for data transmissions of data from the transmitting node, and the precoding control indicator representing a precoding code applicable to the preferred rank,
wherein the feedback subframe comprises a channel quality indicator field, a rank indicator field, and a precoding control indicator field respectively corresponding to the channel quality indicator, the rank indicator, and the precoding control indicator parameters,
wherein the feedback manager is structured to:
determine that the extended value is required for the channel quality indicator when it is determined that the rank indicator is equal to one, and
generate the extended channel quality indicator value by pad the channel quality indicator value with additional bits so as to sufficiently fill the channel quality indicator field of the feedback subframe.

15. A transmitting node of a wireless communication system structured to provide transmission control information to a receiving node, the transmitting node comprising:
a feedback decoder structured to reconstruct a feedback subframe from a feedback signal received from the receiving node over a feedback channel, the feedback subframe comprising a plurality of feedback fields, each feedback field corresponding to one of a plurality of feedback parameters and allocated to carry a value of the corresponding feedback parameter, and a field length of each feedback field being predetermined; and
a transmission parameters manager structured to:
for at least one feedback field, determine whether that feedback field is carrying an extended value or a feedback value of the corresponding feedback parameter, the feedback value being a value of the corresponding feedback parameter, and the extended value being a value that requires further processing to extract the feedback value;
for each feedback field determined to carry the extended value, retrieve the extended value from that feedback field, and extract the feedback value of the corresponding feedback parameter from the extended value;
for each feedback field determined to carry the feedback value, retrieve the feedback value of the corresponding feedback parameter from that feedback field, wherein the transmission parameters manager is structured to strip off padded bits from the extended value to extract the feedback value from the extended value; and
send the transmission control information to the receiving node based on the feedback values, the transmission control information specifying transmission characteristics that will be applied by the transmitting node in transmitting data to the receiving node.

16. The transmitting node of claim 15,
wherein for each feedback field from which the extended value has been retrieved, a length of the extended value is equal to the field length of that feedback field, and a length of the extracted feedback value is less than the field length of that feedback field, and
wherein for each feedback field from which the feedback value has been retrieved, a length of the feedback value is equal to the field length of that feedback field.

17. The transmitting node of claim 15, wherein the transmission parameters manager is structured to
determine that the feedback field is carrying the extended value when it is determined that a value carried in the reference feedback field is equal to a reference value, and
determine that the feedback field is carrying the feedback value when the value carried in the reference feedback field is not equal to the reference value.

18. The transmitting node of claim 16,
wherein the plurality of feedback parameters include a channel quality indicator, a rank indicator, and a precoding control indicator, the channel quality indicator representing a quality of the wireless channel between the transmitting node and the receiving node as estimated by the receiving node, the rank indicator representing a rank of data transmission preferred by the receiving node for data transmissions of data from the transmitting node, and the precoding control indicator representing a precoding code applicable to the preferred rank, wherein the feedback subframe comprises a channel quality indicator field, a rank indicator field, and a precoding control indicator field respectively corresponding to the channel quality indicator, the rank indicator, and the precoding control indicator parameters, and wherein the transmission parameters manager is structured to determine that the channel quality indicator field is carrying an extended channel quality indicator when it is determined that the feedback value of the rank indicator field indicates that the receiving node preferred rank is equal to one, and strip off padded bits of the extended channel quality indicator value carried in the channel quality indicator field of the feedback subframe.

19. A non-transitory computer-readable medium which comprises program instructions which when executed by a computer of a receiving node causes the computer to execute the method of claim 1.

20. A non-transitory computer-readable medium which comprises program instructions which when executed by a computer of a transmitting node causes the computer to execute the method of claim 6.

* * * * *